Inventor
Attorney

Dec. 18, 1962  R. W. GOTCH  3,069,529
WELDING TORCH FOR EXTERNALLY BUTT WELDING
CYLINDRICAL MEMBERS TOGETHER
Filed Aug. 23, 1960  2 Sheets-Sheet 2
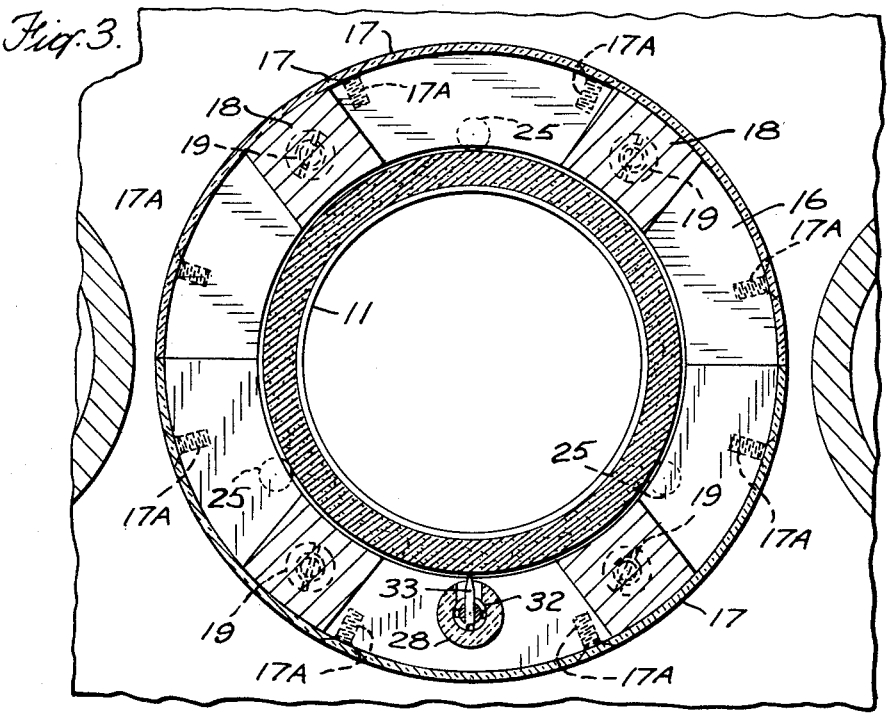
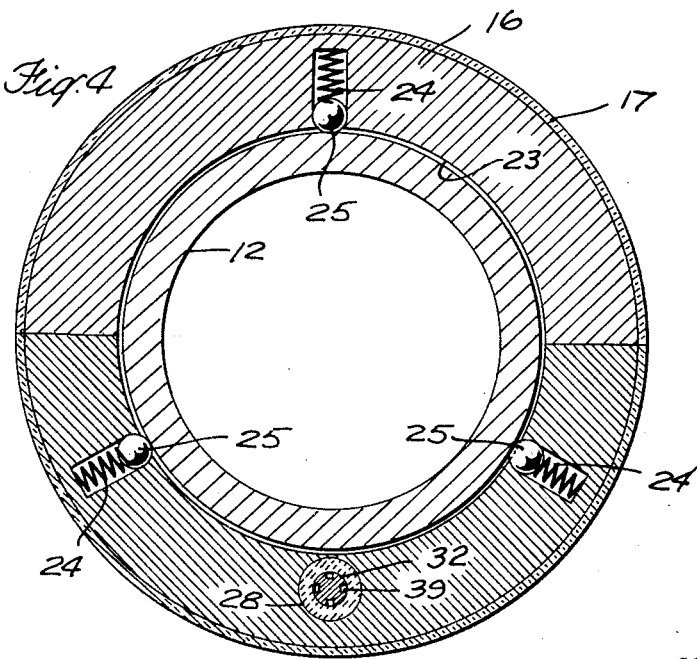
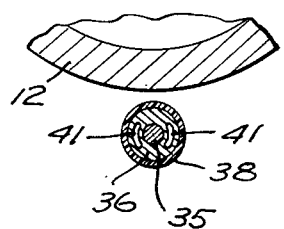
Inventor
By Arthur Frederick
Attorney

United States Patent Office 3,069,529
Patented Dec. 18, 1962

3,069,529
WELDING TORCH FOR EXTERNALLY BUTT WELDING CYLINDRICAL MEMBERS TOGETHER
Ronald William Gotch, Ashford, England, assignor to Foster Wheeler Corporation, New York, N.Y., a corporation of New York
Filed Aug. 23, 1960, Ser. No. 51,449
7 Claims. (Cl. 219—60)

This invention relates to apparatus for electric arc welding and, more specifically, to apparatus for butt welding circular members together. The invention is particularly concerned with the problem of producing reliable welds on closely spaced tubular members of relatively small diameter.

In the fabrication of heat exchange units having a plurality of relatively small diameter tubes arranged in close center to center spaced relationship to each other, the welding of the tubes to the tube sheets or cylindrical headers is most difficult, if not impossible, with presently known welding apparatuses because of the very limited working space which is available between the tubes. In an effort to provide a heat exchange unit wherein closely spaced tubes are welded to a tube sheet or cylindrical header, it has been found preferable to first weld nipples or stub tubes at one end to the tube sheet or cylindrical header and thereafter butt weld the desired length of the tube to the stub tubes. However, there still exists in this method of fabrication the problem of producing a reliable weld joint between the tube and stub tube by reason of the relatively small working space between adjacent tubes at the point of weld and the length of the tubes.

It is, therefore, an object of the present invention to provide an electric arc welding torch capable of producing a reliable high strength weld joint between two abutting tubes which torch requires very little working space adjacent the tubes to be welded together.

It is another object of the present invention to provide an electric arc welding torch which is capable of welding heat exchange tubes disposed on closer center to center spacing than was possible heretofore.

It is a further object of this invention to provide an electric arc welding torch of relatively simple compact construction and requiring a minimum working space adjacent to the point of weld.

It is a still further object of this invention to provide an arc welding torch of such construction that an inert gas atmosphere may be maintained at the point of weld with a minimum loss of inert gas.

Accordingly, the present invention contemplates a novel electric arc welding torch comprising a cylindrical housing having spaced end walls, each of which end wall has an opening adapted to receive therethrough the end portions of two tubular members to be butt welded together. A tubular shield of dielectric heat resistant material, such as ceramic, is supported within the housing in spaced parallel relationship to the longitudinal axis of the housing and the tubular members to be welded together. Within the shield is disposed an electrode holder which supports an electrode having a tip portion extending radially inwardly toward the point of weld and projecting through an opening in the shield. The electrode holder is connected at its end opposite from the electrode to a source of electrical current to supply electric current to the electrode. The electrode holder is also adapted to allow passage of inert gas, such as argon, to the point of weld through the opening in the shield. Means are provided for securing the housing to at least one of the tubular members to be welded together and for rotating the housing concentrically about the tubular members so that the electrode is carried in a circular path about the junction of the tubular members.

The wall of the housing extends between the opposite end walls thereof and defines an annular screen which is preferably constructed of a transparent heat resisting material, such as glass or Plexiglas, so that the progress of the weld may be observed as the weld is being made. The housing is also preferably constructed of two complementary semi-cylindrical parts which are secured together at the opposite end walls by any suitable means, such as stud bolts. This split construction of the electric arc welding torch enables the torch to be positioned for welding on the tubular members, after the two tubular members are positioned in endwise abutment with each other, in the space between the tubes to be welded together and the adjacent tubes.

The invention will be more fully understood from the following detailed description thereof when considered in connection with the accompanying drawing wherein but one embodiment of the invention is illustrated by way of example, and in which:

FIG. 3 is a transverse view in section taken along line 3—3 of FIG. 1;

FIG. 4 is another sectional view taken along line 4—4 of FIG. 1; and

FIG. 5 is a fragmentary view in section taken along line 5—5 of FIG. 1.

Figures 1, 2:
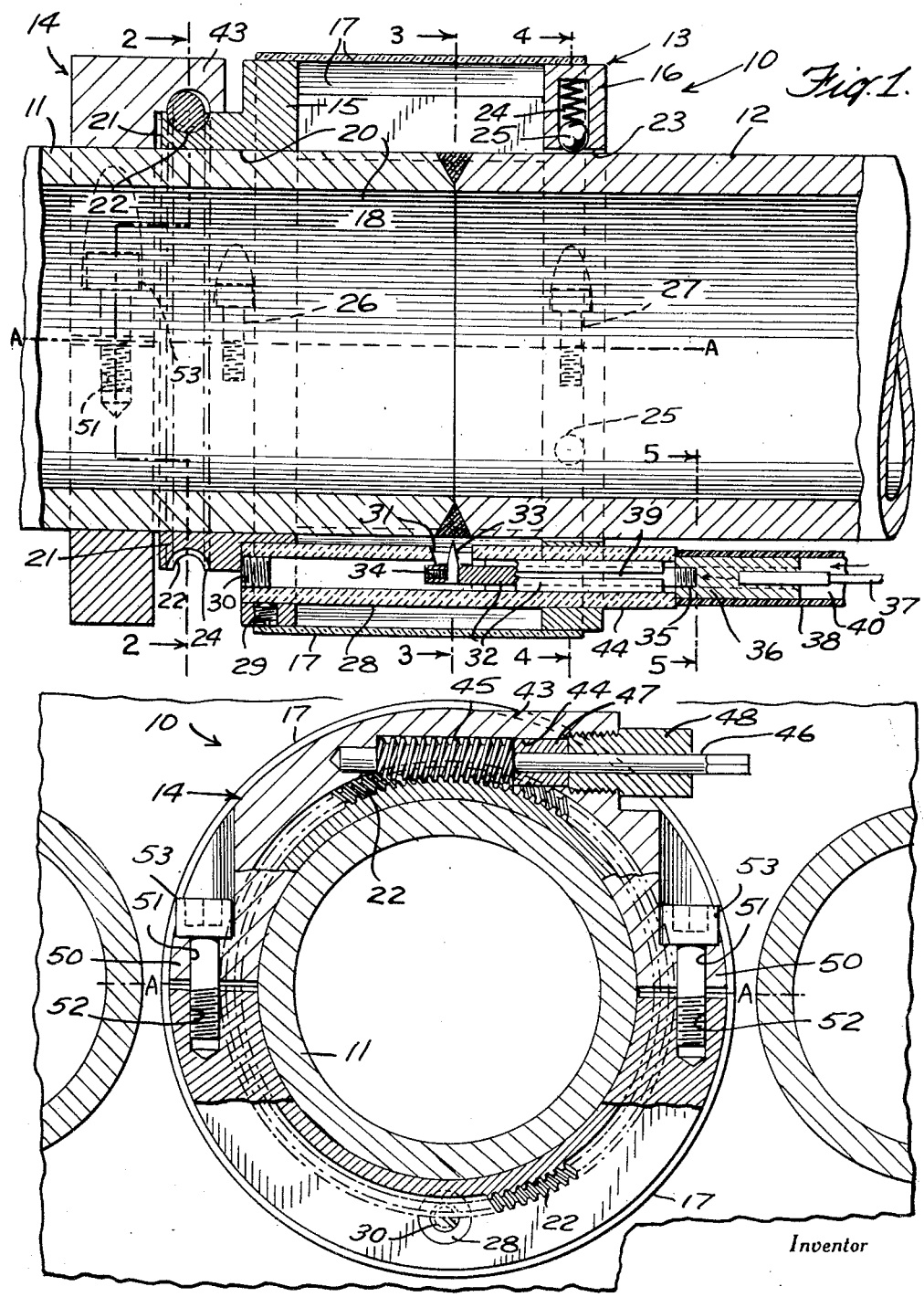
FIG. 1 is a longitudinal sectional view of the welding torch according to this invention shown in welding position.
FIG. 2 is a transverse sectional view taken along line 2—2 of FIG. 1, showing portions of two adjacent tubular members.

Referring now to the drawings, the electric arc welding torch of this invention is generally designated by the reference numeral 10, and is illustrated as attached to a nipple or stub tube 11 and a length of tube 12 which have been butt welded together by torch 10. Tubes 11 and 12 are of relatively small O.D. and, as best shown in FIGS. 2 and 3, are part of a plurality of similar pairs of butt welded tubes extending in parallel relation to each other and arranged in relatively close center to center spaced relationship with each other. Torch 10 comprises a hollow cylindrical housing 13 and a securing member 14.

Housing 13 of torch 10 comprises two spaced ring shaped end walls or positioning members 15 and 16 and a peripheral or annular cylindrical screen or wall 17. End walls 15 and 16 are secured in spaced parallel relationship to each other by a plurality of spacer members 18. Each of the spacer members 18 are secured at the opposite ends to end walls 15 and 16 by means of screws 19 (FIG. 3) or in any other suitable manner. The screen 17, which is preferably constructed of a transparent heat resistant material, such as glass or Plexiglas, is dimensioned so that the opposite ends thereof overlap the outer peripheral surfaces of walls 15 and 16 and is secured to the walls in any suitable manner, as for example, by countersunk screws 17A.

End wall 15 is dimensioned to provide an axial opening 20 therein of such size as to snugly receive the end portion of tube 11 therein, but not so tightly as to restrict the rotation of housing 13 about tubes 11 and 12. End wall 15 is also provided with an outwardly extending hub portion 21 in the outer peripheral surface of which is milled a worm wheel 22 by which housing 13 is rotated about tubes 11 and 12, as will be more fully described hereinafter.

As best shown in FIG. 4, end wall 16 is dimensioned to provide an axial opening 23 therein coaxially aligned with opening 20 in end wall 15 and of a size slightly larger in diameter than the diameter of tube 12. End wall 16 is provided with a plurality of circumferentially spaced, spring loaded ball catch assemblies 24, the balls 25 of the assemblies partially extending into opening 20 to engage the outer periphery of tube 12 when the latter is in position for welding. Ball catch assemblies 24 serve to compensate for any slight misalignment of tubes 11 and 12 and maintains end wall 16 in concentric relationship to tube 12.

As shown, housing 13 of torch 10 is split and separable into two complementary parts in a plane indicated at A—A in FIGS. 1 and 2, extending through the longitudinal axis of housing 13. The upper part of housing 13, as viewed in the drawings, comprises the upper halves of end walls 15 and 16 and of peripheral or annular screen 17, while the lower part comprises the lower halves of end walls 15 and 16 and of screen 17. The abutting edges of the upper and lower parts of the screen 17 may be formed to provide a lap joint, while the abutting surfaces of the respective upper and lower parts of end walls 15 and 16 merely contact each other. The two complementary parts of housing 13 are secured together by means of a pair of socket head type bolts 26 and 27 (only one of each pair being shown in broken lines in FIG. 1). Each bolt 26 extends through a hole in the upper part of end wall 15 and is turned into a threaded opening in the abutting surface of the lower part of end wall 15. Similarly, each bolt 27 extends through a hole in the upper part of end wall 16 and is turned into a threaded opening in the abutting surface of the lower part of end wall 16. The outer peripheral surface of end walls 15 and 16 are each provided with a pair of notches to provide clearance for the heads of bolts 26 and 27 and to provide a pair of flanges which serve as a seat for the bolt heads in the same manner, as shown in FIG. 2, for securing member 14. Bolts 26 and 27 are turned into their respective threaded openings to draw the two complementary parts of housing 13 in tight abutting relationship.

As shown in FIGS. 1 and 3, the lower part of housing 13 supports a tubular shield 28 which is constructed of electrical insulating and heat resistant material, such as ceramic. Shield 28 projects parallel to the longitudinal axis of housing 13 through aligned openings in end walls 15 and 16 and is secured within those openings in a suitable manner, as by a set screw 29. The end of shield 28 which is supported in end wall 15 is sealed by a threaded plug 30. An opening 31 is provided in the surface of shield 28 about midway between the opposite ends of shield 28 so as to communicate the interior of shield 28 with the chamber formed between end walls 15 and 16 and screen 17 of housing 13.

An electrode holder 32 is disposed within shield 28 and extends from the open end of shield 28 to a point adjacent opening 31 in the shield. A non-consumable type electrode 33, such as tungsten, is supported in an opening in electrode holder 32 in a position to extend radially inwardly through opening 31 in shield 28, toward the point of abutment of tubes 11 and 12. Electrode 33 is held in position by a set screw 34 threaded into the end of electrode holder 32. The end portion 35 of electrode holder 32 which projects slightly beyond the open end of shield 28 is threaded for connection with a terminal block 36. A plurality of spaced longitudinally extending grooves 39 are formed in the outer surface of electrode holder 32 so that a plurality of passageways are defined between the inner surface of shield 28 and grooves 39.

Terminal block 36 has a threaded axial bore which is adapted to receive therein, end portion 35 of electrode holder 32. In the opposite end of terminal block 36 is secured one end of an electrical cable 37 which is connected at its opposite end to a source of electrical current (not shown). Electrode holder 32 and terminal block 36 are constructed of suitable electrical conducting material, such as copper, so that electrical current is conducted from cable 37 through terminal block 36 and electrode holder 32 to electrode 33. To electrically insulate terminal block 36 and cable 37, a flexible tubular member 38 is secured over those members. Tubular member 38 has an inside diameter substantially larger than the outside diameter of cable 37, thereby providing an annular passageway 40 which by means of a suitable connection (not shown), is in communication with a source (not shown) of inert gas, such as argon. Terminal block 36 is provided with longitudinally extending apertures 41 (shown only in FIG. 5), which connect passageway 40 with the passageways defined by grooves 39 in electrode holder 32 and shield 28 so that inert gas may flow from passageway 40 through apertures 41, thence through passageways formed by grooves 39 in electrode holder 32 and shield 28, to the point of weld through opening 31 in the shield. Thus it can be seen that torch 10, provides for the maintenance of an inert gas atmosphere surrounding the point of weld so that oxidation of the molten metal is minimized, whereby a defect free weld is produced.

As best shown in FIGS. 1 and 2, securing member 14 is a ring shaped member which is split and separable, as housing 13, to form two complimentary parts each of which has an arcuate shaped inner surface which is adapted to embrace a substantially semi-circular portion of tube 11. The upper part of securing member 14, as viewed in the drawings, is provided with an integral segmental flange portion 43 which is dimensioned to overlap part of hub portion 21 of end wall 15. Flange portion 43 is provided with a bore 44 extending transversely of the longitudinal axis of tubes 11 and 12, and in which is rotatably mounted a worm 45. As shown in FIG. 2, worm 45 is secured to a shaft 46 which is supported for rotation in a spacer member 47 and a threaded bushing 48. The end of shaft 46 projecting beyond bushing 48 is connected to one end of a flexible drive shaft (not shown), which is connected at its opposite end to a source of rotary power (not shown).

To clamp securing member 14 to tube 11, the peripheral surface of the upper part of the securing member 14 is notched-out adjacent each end of the upper part to provide two flange portions 50. A hole 51 is provided in each flange portion 50 which registers with a threaded hole 52 provided in each end face of the lower part of securing member 14. A socket head type bolt 53 is passed through each hole 51 and is turned into each threaded hole 52 to draw the upper and lower parts of securing member 14 together until the inner peripheral surface of the upper and lower parts tightly embrace the surface of tube 12 to thereby clamp securing member 14 securely to tube 12.

Before securing member 14 is clamped to tube 11, securing member 14 is positioned with flange portion 43 overlapping hub 21 of end wall 15 of housing 13 and worm 45 in meshing relationship with worm wheel 22 formed in hub 21 of end wall 15. The two complimentary parts of securing member 14 are so dimensioned in relation to the diameter of tube 11 that, when securing member 14 is clamped to tube 11, worm 45 is not brought into such tight meshing relationship with worm wheel 22 as to cause binding and prevent rotation of housing 13.

The electric arc welding torch 10 is connected to equipment for automatic operation, which equipment is well known to those skilled in the art and may comprise an electric motor, spark starter and crater filler current decay device, regulator unit, and inert gas supply bottle.

In operation of the arc welding torch 10 of this invention, the upper and lower parts of housing 13 are positioned around tubes 11 and 12 which are to be butt welded together. The upper and lower parts of housing 13 are then secured in tight abutting relationship by turning the pair of bolts 26 and 27 into their respective threaded holes in the abutting surface of the lower parts of end walls 15 and 16. The upper and lower parts of securing member 14 are then positioned around tube 11 adjacent end wall 15, with the worm 45 in meshing relationship with worm wheel 22 formed in the hub 21 of end wall 15. Thereafter, bolts 53 are turned into holes 52 to draw together the upper and lower parts of securing member 14 until the inner surfaces of the upper and lower parts grip the outer surface of tube 11, but not so tightly as to prevent movement of securing member 14 longitudinally of tube 11. The welding torch 10 is then positioned on tubes 11 and 12, by movement parallel to the longitudinal axis of tubes 11 and 12, so as to bring electrode 33 in proper register with the plane of the joint between tubes 11 and 12. The bolts 53 of securing member 14 are then given a final tightening to draw the lower and upper parts of the securing member 14 sufficiently tight against the surface of tube 12 to prevent movement of arc welding torch 10 parallel to the longitudinal axes of tubes 11 and 12. The positioning of torch 10 so that electrode 33 is in proper register with the point of weld (the point of abutment of tubes 11 and 12), can be visually ascertained since the screen 17 of housing 13 is constructed of transparent material.

After arc welding torch 10 is firmly fixed in proper welding position, as above described, the torch is operated to provide at least two tack welds between tubes 11 and 12 to secure the tubes in the desired alignment. Thereafter, the main welding operation is commenced by flow of electrical current through cable 37, terminal block 38 and electrode holder 32 to electrode 33. Since the work, tubes 11 and 12, are electrically incorporated in the electrical circuit of which the electrode is a part, an arc is struck from the tip of electrode 33 to tubes 11 and 12. No electrical arcing will occur, except at the tip of electrode 33, because electrode holder 32 is electrically insulated from housing 13 by shield 28, and terminal block 36 and cable 37 are electrically insulated from tube 12 and other metallic objects by flexible tubular member 38.

Simultaneously, with the flow of electrical current to electrode 33, inert gas is supplied to the chamber surrounding tubes 11 and 12 formed by housing 13. Inert gas is allowed to flow from a source thereof (not shown), through passageway 40 in tubular member 38, thence through apertures 41 in terminal block 36. From apertures 41, the gas flows through the passageways formed between grooves 39 in electrode holder 32 and the inner surface of shield 28, and into the chamber, formed by housing 13 surrounding tubes 11 and 12, through opening 31 in shield 28. It has been found preferable to flow inert gas through tubes 11 and 12 during the welding operation to minimize oxidation of the molten metal adjacent the interior of tubes 11 and 12.

After the initial arc is struck from the tip of electrode 33 to tubes 11 and 12, a predetermined time is allowed to provide the desired degree of penetration and thereafter, housing 13 is rotated about tubes 11 and 12 to carry electrode 33 in a circular path about the point of abutment of tubes 11 and 12. To rotate housing 13, worm 45 is rotated from a source of rotary power (not shown), such as an electric motor, through flexible drive shaft (not shown) and shaft 46. Since worm 45 is in mesh with worm wheel 22, worm wheel 22 is rotated, which in turn, causes housing 13 to rotate since worm wheel 22 is an integral part of hub 21 of end wall 15 of housing 13. The housing 13 is rotated to complete the weld with a slight overlay after which the electrical current is switched off to stop arcing from the electrode and rotation of housing 13. Also, flow of inert gas to the weld is stopped.

After completion of the weld, torch 10 is removed from tubes 11 and 12 by first unscrewing bolts 53 to permit separation and removal of the upper and lower parts of securing member 14. Similarly, bolts 26 and 27 are removed to enable the upper and lower parts of housing 13 to be separated and thence removed. Torch 10 thereafter, may be reassembled around another pair of tubes to be butt welded together in the same manner as described for the butt welding of tubes 11 and 12.

Electric arc welding torch 10 may be used to weld tubes 11 and 12 together by the parent fusion welding technique, in which case the ends of the tubes may be suitably bevelled as shown in the drawing. Alternatively, electric arc welding torch 10 may be employed to weld tubes 11 and 12 together by the insert technique, wherein a ring of filler metal is inserted between the abutting ends of the two tubes.

Electric arc welding torch 10, herein described, has been used to successfully butt weld tubes together having 1.5 inch outside diameter and 1 inch inside diameter, which tubes were arranged on a center to center triangular spacing of 3.25 inches.

It can be readily seen from the foregoing disclosure, that a novel welding torch has been provided which requires very little working space to butt weld two tubular members together. It is an electric arc welding torch capable of producing a weld in an inert atmosphere with a minimum loss of inert gas. It is also a torch capable of producing a reliable weld between two abutting tubular members which are arranged with other tubular members on a close center to center spaced relationship.

Although, but one embodiment of the invention has been illustrated and described in detail, it is to be expressly understood that the invention is not limited thereto. Various changes can be made in the arrangement of parts without departing from the spirit and scope of the invention as the same will now be understood by those skilled in the art. For example, housing 13 may have a box like configuration rather than cylindrical where, in its use, the working space available between adjacent tubular members is greater than where torch 10 must be employed, without departing from the scope and spirit of the present invention.

What is claimed is:

1. An inert gas shielded electric arc welding head for externally butt welding tubular members in abutting relationship comprising a torch member; said torch member having an elongated rod-like electrode holder, a narrow tube-like shield having a central bore of slightly greater diameter than said electrode holder and of an electrically insulating and heat-resisting material, said holder being disposed axially within said shield, an aperture in the side wall of said shield, and a welding electrode supported by said holder and projecting radially from the axis of said shield through said aperture; said welding head further comprising pairs of separable positioning members adapted to engage, at axially spaced apart points along said tubes, the periphery of the tubes with sufficient clearance to allow said members to rotate freely about the tubes, said members including means by which said shield and electrode holder are mounted close to and alongside the abutting tubes with the axes thereof parallel to the axes of the tubes, said positioning members further including drive means by which they are rotated whereby said torch is carried around the tubes with its electrode directed radially inwardly towards the junction of said tubes, said shield being adapted for the passageway of an inert gas by way of its bore to the vicinity of said welding electrode.

2. A welding head according to claim 1 and further including an annular screen of heat resisting material supported by said set of positioning members, said screen being arranged to define with said positioning members an enclosed area about said welding electrode and the junction of the abutting tubes by which an effective covering of inert gas is maintained.

3. A welding head according to claim 1 and further including hub portions depending in a direction coaxial with the tubes from one pair of the positioning members and defining a cylindrical configuration having a lesser external diameter than the positioning member, the drive means being arranged to engage said hub portions.

4. A welding head according to claim 3, in which said mechanical drive means includes a clamp adapted to be fixed to one of said tubes, a worm supported by said clamp and a worm gear supported on said hub portions operatively engaging said worm.

5. A welding head according to claim 1 in which at least one of said positioning members is arranged to co-act with one of the abutting tubes to provide a loose fit between the tube and the positioning member, said positioning member having spring loaded ball catches engaging the tube by which the positioning member is steadied and compensating for slight misalignment of the tubes.

6. An inert gas shielded electric arc welding head for externally butt welding tubular members in abutting relationship comprising a torch member; said torch member having an elongated rod-like electrode holder, a narrow tube-like shield of a ceramic material having a central bore of slightly greater diameter than said electrode holder, said holder being disposed axially within said shield, an aperture in the side wall of said shield, and a welding electrode supported by said holder and projecting radially from the axis of said shield through said aperture; said welding head further comprising pairs of separable positioning members adapted to engage, at axially spaced apart points along said tubes, the periphery of the tubes with sufficient clearance to allow said members to rotate freely about the tubes, said members including means by which said shield and electrode holder are mounted close to and alongside the abutting tubes with the axes thereof parallel to the axes of the tubes, said positioning members further including hub portions depending in a direction coaxial to the tubes defining a cylindrical configuration having a lesser external diameter than the positioning members, and drive means arranged to engage said hub portions by which said torch is carried around the tubes with its electrode directed radially inwardly towards the junction of said tubes; and an annular screen of heat resisting material, at least a portion of which is transparent arranged so as to make visible the progress of the weld, supported by said set of positioning members and arranged to define with said positioning members an enclosed area about said welding electrode and the junction of the abutting tubes, said tube-like shield being adapted for the passageway of an inert gas by way of its bore to said enclosed area by which an effective covering of inert gas in the vicinity of said welding electrode is maintained.

7. A welding head according to claim 6 further including a clamp adapted to be fixed to one of said tubes, a worm supported by said clamp and a worm gear supported on said hub portions operatively engaging said worm by which said torch is rotated.

References Cited in the file of this patent

UNITED STATES PATENTS

| | | |
|---|---|---|
| 1,775,311 | Halle | Sept. 9, 1930 |
| 2,721,248 | Kirkpatrick | Oct. 18, 1955 |
| 2,788,430 | Oakley | Apr. 9, 1957 |
| 2,795,689 | McNutt | June 11, 1957 |
| 2,835,783 | Watson | May 20, 1958 |
| 2,914,653 | Ernst | Nov. 24, 1959 |
| 2,982,843 | Field | May 2, 1961 |